(12) United States Patent
Wiegand

(10) Patent No.: US 12,729,792 B2
(45) Date of Patent: Sep. 8, 2026

(54) COUPLING FOR DOUBLE-WALLED TUBES

(71) Applicant: Airbus Operations GmbH, Hamburg (DE)

(72) Inventor: Steffen Wiegand, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/823,120

(22) Filed: Sep. 3, 2024

(65) Prior Publication Data

US 2025/0075837 A1 Mar. 6, 2025

(30) Foreign Application Priority Data

Sep. 6, 2023 (EP) .................................... 23195601

(51) Int. Cl.
*F16L 39/00* (2006.01)

(52) U.S. Cl.
CPC .................................. *F16L 39/005* (2013.01)

(58) Field of Classification Search
CPC ......... F16L 39/00; F16L 39/005; F16L 37/56; F16L 37/565
See application file for complete search history.

(56) References Cited

U.S. PATENT DOCUMENTS 236,519 A * 1/1881 Walsh ................... F16L 39/005 285/356
2,680,901 A * 6/1954 Kaiser ................... F16L 39/005 29/455.1
2,787,481 A * 4/1957 Van Orden ............. F16L 39/00 428/653
3,498,647 A 3/1970 Schroder
(Continued)

FOREIGN PATENT DOCUMENTS

DE 102018123475 A1 3/2020
FR 3002612 A1 * 8/2014 ............ F16L 39/005
(Continued)

OTHER PUBLICATIONS

Extended European Search Report including Written Opinion for Application No. 23195601.2 dated Feb. 12, 2024, pp. 1-11.

*Primary Examiner* — Matthew Troutman
*Assistant Examiner* — Fannie Kee
(74) *Attorney, Agent, or Firm* — Lerner David LLP

(57) ABSTRACT

A support for coaxial flanges of a double-coaxial coupling includes a circular support structure providing a primary mounting zone for attaching a primary flange for connecting a primary outer tube, and a secondary mounting zone for attaching a secondary flange for connecting a coaxial secondary inner tube. The primary and the secondary mounting zones are spaced apart from each other in a radial direction for centering the primary and the secondary flanges in a radially spaced coaxial manner. The primary mounting zone provides an outer circumferential connection region with at least three mounting points for attaching the primary flange. The secondary mounting zone provides an inner circumferential connection region with at least three mounting points for attaching the secondary flange. A thermal path within the circular support structure between the mounting points of the primary and secondary mounting zones is longer than the distance between the two points.

13 Claims, 4 Drawing Sheets

(56) References Cited

U.S. PATENT DOCUMENTS

| | | | | |
|---|---|---|---|---|
| 3,503,634 | A * | 3/1970 | Cadiou | F16L 39/00 277/609 |
| 8,308,200 | B1 * | 11/2012 | Barnes | F16L 39/005 285/123.1 |
| 2009/0123221 | A1 * | 5/2009 | Marshall | F16L 39/005 403/24 |
| 2009/0256352 | A1 * | 10/2009 | Petit | F16L 39/005 285/123.15 |
| 2012/0104172 | A1 * | 5/2012 | Haug | F16L 39/005 137/15.01 |
| 2015/0369413 | A1 * | 12/2015 | Dill | F16L 39/005 228/139 |
| 2017/0198639 | A1 * | 7/2017 | Zabinski | F16L 39/005 |
| 2017/0370506 | A1 * | 12/2017 | Rusch | F16L 39/005 |

FOREIGN PATENT DOCUMENTS

| | | | |
|---|---|---|---|
| KR | 101482981 | B1 | 1/2015 |
| NL | 8205037 | A | 7/1984 |

* cited by examiner 400
406a
406
402
404

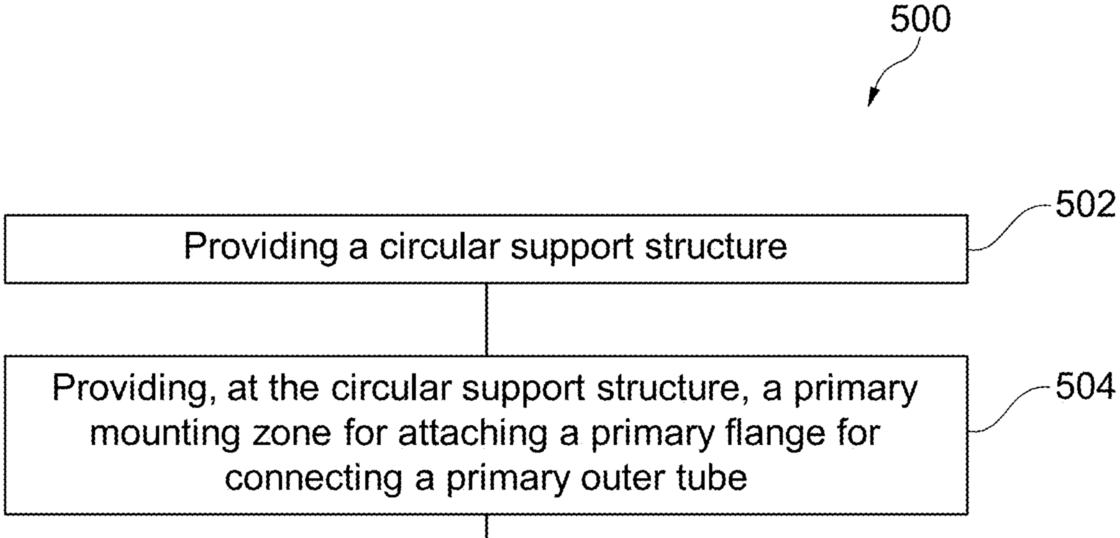

Providing, at the circular support structure, a secondary mounting zone for attaching a secondary flange for connecting a secondary inner tube coaxial to the primary outer tube. The primary mounting zone and the secondary mounting zone are spaced apart from each other in a radial direction for centering the primary flange and the secondary flange in a radially spaced coaxial manner. The primary mounting zone provides an outer circumferential connection region with at least three mounting points for attaching the primary flange. The secondary mounting zone provides an inner circumferential connection region with at least three mounting points for attaching the secondary flange. A thermal path within the circular support structure between a mounting point of the primary mounting zone and an adjacent spaced apart mounting point of the secondary mounting zone is longer than the distance between the two points.

COUPLING FOR DOUBLE-WALLED TUBES

FIELD OF THE INVENTION

The present invention relates to temperature-resistant tubing connections, more specifically to a support, a coupling, a double-coaxial conduit, a double-coaxial tubing system, an aircraft and a method for providing a support.

BACKGROUND OF THE INVENTION

Certain energy supply facilities, like for example fuel cell energy systems, may require the transport of cryogenic fuels from a storing tank to a chemical power conversion unit. This may be realized by means of dedicated fuel supply lines that comprise an insulating structure and are interconnected to run between the storing tank and the chemical power conversion unit. However, the temperature of the cryogenic fuels may impose stress on the interconnections of the dedicated fuel supply lines and their insulating structure. This may in a further consequence lead to increased monitoring and maintenance demand.

SUMMARY OF THE INVENTION

There may thus be a need to provide for improved interconnections of supply lines suitable for cryogenic fuels.

It should be noted that the following described aspects of the invention apply also for the support, for the coupling, for the double-coaxial conduit, for the double-coaxial tubing system, for the aircraft and for the method for providing a support.

According to the present invention, a support for coaxial flanges of a double-coaxial coupling is provided. The support comprises a circular support structure. The circular support structure provides a primary mounting zone for attaching a primary flange for connecting a primary outer tube, a secondary mounting zone for attaching a secondary flange for connecting a secondary inner tube coaxial to the primary outer tube. The primary mounting zone and the secondary mounting zone are spaced apart from each other in a radial direction for centering the primary flange and the secondary flange in a radially spaced coaxial manner. The primary mounting zone provides an outer circumferential connection region with at least three mounting points for attaching the primary flange. The secondary mounting zone provides an inner circumferential connection region with at least three mounting points for attaching the secondary flange. A thermal path within the circular support structure between a mounting point of the primary mounting zone and an adjacent spaced apart mounting point of the secondary mounting zone is longer than the distance between the two points.

As an example, the thermal path is provided as an extended material-based connection reaching from a mounting of the primary mounting zone to an adjacent spaced apart mounting of the secondary mounting zone. The thermal path is longer than the direct distance or a direct connection between the mounting points. The material-based connection provides more like a bow-like connector. For transmission of thermal energy, the energy is guided via the elongate path; the energy so-to-speak travels a longer path and the direct way between the mounting points. The individual mounting points of the primary mounting zone themselves are separated and thermally insulated from each other; similar is the case for the spaced apart mounting points.

As example, the thermal path is a spacer element of the circular support structure that keeps a mounting point of the primary mounting zone and an adjacent spaced apart mounting point of the secondary mounting zone apart from each other, while providing connection therebetween. The thermal path is a spacer element that keeps the primary and the secondary flange at designated distances. The spacer element defines the annular cavity between the primary and the secondary flange to thermally insulate the primary and the secondary flange. Heat can thus travel between the primary and the secondary flange along the thermal path.

In an example, the thermal path is a spacer element that is formed to channel a heat flow between the primary and the secondary flange at the mounting point of the primary mounting zone and the adjacent spaced apart mounting point of the secondary mounting zone.

The term flange relates to a right-angled protruding edge that is used to connect two components that are flush with each other. The flange may be provided at the end of pipes and other rod-shaped components. The flange may be welded as a flange ring to the end of the pipe. The flange rings are usually provided with holes according to a fixed pattern so that two adjacent flanges can be connected with nuts and bolts. In this manner two pipes can be coupled with each other by abutting flanges.

In an example, the flange-based coupling is advantageous over a coupling that is provided by inserting pipe ends within each other, while a flange-based coupling is easier and faster to decouple and poses less restrains to a thermally stressed coupling.

As an effect, thermal transport between the first flange and the second flange is decelerated. As an advantage, the heat gradient between the primary flange and the secondary flange decreases more slowly. As further advantage, thermal stress in the material of the double-coaxial coupling is reduced. As a further advantage, icing or air liquefaction, in cryogenic applications, are avoided. As an advantage, a longer load path of a connection between the primary and the secondary flange provides for more flexibility between the primary and the secondary flange. As a further advantage, a direct structural connection from inner pipe to outer pipe sealing area on the radial plane is avoided. As a result, the monitoring and maintenance demand is decreased.

According to an example, the circular support structure is preloadable by a force acting between the mounting point of the primary mounting zone and the mounting point of the secondary mounting zone.

According to an example, the circular support structure comprises a U-shaped profile in its axial cross-section. The U-shaped profile is open to the mounting point of the primary mounting zone and the mounting point of the secondary mounting zone. The U-shaped profile provides for stiffness between the mounting point of the primary mounting zone and the mounting point of the secondary mounting zone in an axial and radial direction.

According to an example, legs of the U-shaped profile comprise sleeve-like structures. An apex of the U-shaped profile comprises a ring-like structure.

According to the present invention, also a coupling is provided. The coupling comprises a primary flange, a secondary flange and a support according to one of the previous examples. The support rigidly connects the primary flange and the secondary flange and centers the secondary flange and the primary flange in a radially spaced coaxial manner. The primary flange and the secondary flange respectively are each provided with an axially facing flange side for a sealingly-tight coupling connection to a respective counter part.

As an advantage, the reduction of thermal transport between the primary and secondary flanges prevents their temperature-induced deformation.

As an advantage, the reduction of thermal transport between the primary and secondary flanges prevents a temperature-induced deformation of the primary flange with respect to the secondary flange.

As a further advantage, increasing the time of reaching the temperature equilibrium between inner and outer pipe of the secondary flange and the primary flange respectively might lead to omitting and/or avoiding the use of additional insulation at the flanges.

As a further advantage, the coupling, or double wall pipe flange withstands the stresses induced by a temperature shock of for example 50 K at the inner pipe medium at the primary flange and 300 K outer pipe environment at the secondary flange.

As an advantage, the force applied on the primary flange can be transmitted via the support to the secondary flange and vice versa.

As an advantage, the force applied on the primary flange can be used to sealingly press the secondary flange to an abutting secondary flange.

As an advantage, the double walled pipe flange, i.e., the coupling enables a continuous interspace and in parallel has a relatively low heat transfer from an attached inner pipe to an attached outer pipe or in the opposite direction.

As an advantage, whilst keeping the same basic functions for a double walled pipe flange for a continuous interspace, is that due to a huge temperature gradient, no excessive stresses will occur in the coupling.

According to the present invention, also a double-coaxial conduit is provided. The double-coaxial conduit comprises a double-coaxial tube arrangement with a primary outer tube and a secondary inner tube and at least one coupling according to one of the previous examples. A circumferential portion of one end of the primary outer tube is sealingly attached to a primary flange of the coupling. A circumferential portion of one end of the secondary inner tube is sealingly attached to a secondary flange of the coupling. A circular support structure comprises axially oriented passages between an inner side of the primary outer tube and an outer side of the secondary inner tube.

As an advantage, thermal transport between the primary outer tube and the secondary inner tube is reduced.

As an advantage, flexibility between the primary outer tube and the secondary inner tube is allowed.

As an advantage, the use of double walled pipe assemblies which are already combined pre-assembled is enables.

As a further advantage, advantages in the manufacturing, in service and spare part handling and/or warehousing of the in the double-coaxial tubing system are provided.

According to the present invention, also a double-coaxial tubing system is provided. The double-coaxial tubing system comprises at least two double-coaxial conduits according to one of the previous examples and at least one fastening structure. The fastening structure provides a clamping force by pressing adjacent primary flanges of the at least two double-coaxial conduits against each other.

As an advantage, a tubing system is yielded that allows the coaxial flow of two different fluid streams.

As an advantage, a tight and temperature resistant tubing system is yielded.

As an advantage, a stress-resistant tubing system is yielded.

According to the present invention, also an aircraft is provided. The aircraft comprises a fluid reservoir storing a fluid, at least one load configured for operating with the fluid and a double-coaxial tubing system of the previous example. The double-coaxial tubing system supplies the fluid from the fluid reservoir to the at least one load.

As an advantage, an aircraft with a hydrogen-leak tight tubing system is yielded.

As a further advantage, a safer aircraft is yielded.

According to the present invention, also a method for providing a support for coaxial flanges of a double-coaxial coupling is provided. The method comprises the following steps:

Providing a circular support structure,

Providing, at the circular support structure, a primary mounting zone for attaching a primary flange for connecting a primary outer tube, Providing, at the circular support structure, a secondary mounting zone for attaching a secondary flange for connecting a secondary inner tube coaxial to the primary outer tube. The primary mounting zone and the secondary mounting zone are spaced apart from each other in a radial direction for centering the primary flange and the secondary flange in a radially spaced coaxial manner. The primary mounting zone provides an outer circumferential connection region with at least three mounting points for attaching the primary flange. The secondary mounting zone provides an inner circumferential connection region with at least three mounting points for attaching the secondary flange. A thermal path within the circular support structure between a mounting point of the primary mounting zone and an adjacent spaced apart mounting point of the secondary mounting zone is longer than the distance between the two points.

According to an aspect, a connection for a tube-in-tube arrangement is provided. The connection is provided to both an inner and outer tube of the tube-in-tube arrangement. The connection comprises two radial joining portions, one for each tube. The connection is attachable to another tube-in-tube arrangement. To slow down thermal exchange in-between the two radial joining portions, their interconnection is provided as an elongated thermal conductor between the two radial joining portions. The thermal pathway is arranged extending away from the radial plane of the flange connection. In that manner, a direct thermal and mechanical contact between the two radial joining portions in their radial plane is avoided. Overall, this reduces mechanical stress at the connection, if the inner and outer tube comprise different temperatures.

According to an aspect, an inner tubing or pipe is placed in an outer tubing or pipe and a coupling or connection region is provided at the end of both inner and outer tubing. The inner tubing is held at the outer tubing at the connection region. The inner tubing is held at the outer tubing with the premise to provide a stable connection which on the other hand is modified to reduce thermal energy transfer between the inner tubing or pipe and the outer tubing or pipe at the connection region. The stable connection is further formed to provide a fluid flow in the interspace between the inner pipe and the outer pipe that continues beyond the connection region into the interspace of an abutting inner and outer tube arrangement. The stable connection is formed under the compromise of providing the stable connection while providing a fluid flow in the interspace. The stable connection is further formed to minimize the physical contact between the inner and the outer tube while still connecting the inner and the outer tube. The stable connection is further formed to keep the inner and the outer tube spaced apart to thermally isolate them from each other while allowing a fluid flow in the interspace between the outer tube and the inner tube. These conditions are fulfilled by a stable connection between the inner and the outer tube that is longer than a direct connection and radial distance between the inner and the outer tube and that resembles an elongate connection that stretches the material linked heat transfer route between the inner and the outer pipe.

According to an aspect, a spacer element for connecting ends of a double walled tube is provided. The spacer element keeps the connecting ends apart from each other while connecting them. The spacer elements provide an elongated material path between the connecting ends that is longer than the direct radial distance between the connecting ends in order to elongate the direct load path between the connecting ends and the direct thermal transfer route.

According to an aspect, a coupling is provided that enables a fluid flow in the interspaces of a first and a second abutting double walled tube. The coupling provides a connection of the fluid flows of both double walled tubes and enables the fluid flow in the interspace of both double walled tubes beyond the coupling. The coupling provides the fluid flow by a connection at the coupling that on one hand is permeable for gas but on the other hand also connects the inner and outer tubes of the double walled tubes and keeps them apart.

According to an aspect, a support element is provided that resembles a constructional agreement between a stable connection between an inner tube centered in an outer tube while minimizing the contact between the inner tube and the outer tube.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings:

FIG. 6 shows basic steps of an example of a method for providing a support for coaxial flanges of a double-coaxial coupling.

DETAILED DESCRIPTION OF EMBODIMENTS

Figure 1:
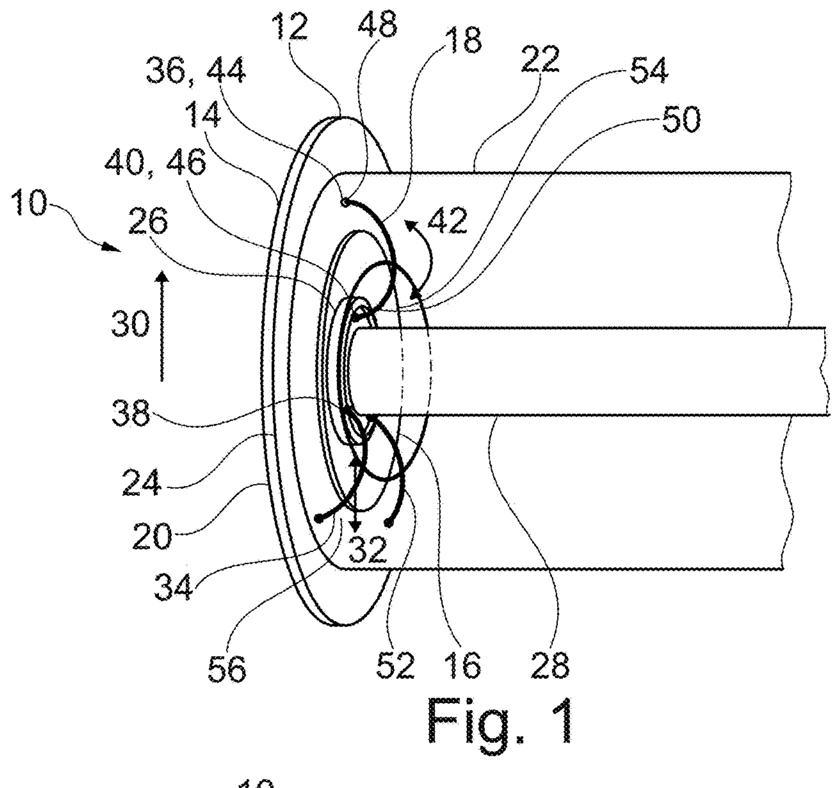
FIG. 1 shows a general scheme of a cross section through a primary outer tube comprising an example of a support.

Certain embodiments will now be described in greater details with reference to the accompanying drawings. In the following description, like drawing reference numerals are used for like elements, even in different drawings. The matters defined in the description, such as detailed construction and elements, are provided to assist in a comprehensive understanding of the exemplary embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

In an example, a double walled pipe flange, i.e., a coupling, for continuous interspaces, continuous shroud, e.g., in shrouded fuel pipes, is provided. The continuous shroud/interspace can be drained in general. Normally the inner pipe flange, i.e., secondary flange, is structurally seen directly connected to the outer pipe flange, i.e., primary flange. Functionally the inner and outer pipe flanges are separated in terms of medium flow. This is enabled by using at least two seals and/or gaskets plus circumferential bore holes or similar between the seals to enable a continuous interspace. This works well when the temperatures in the inner pipe and outer pipe or environment do not differ that much. If there is a huge temperature difference or temperature shock consequently huge stress values will occur in the flange due to the direct structural connection and hence as well the direct heat conduction path.

FIG. 1 shows a general scheme of a cross section through a primary outer tube comprising an example of a support. The support 10 for coaxial flanges 12 of a double-coaxial coupling 14 comprises a circular support structure 16. The circular support structure 16 provides a primary mounting zone 18 for attaching a primary flange 20 for connecting a primary outer tube 22 and a secondary mounting zone 24 for attaching a secondary flange 26 for connecting a secondary inner tube 28 coaxial to the primary outer tube 22. The primary mounting zone 18 and the secondary mounting zone 24 are spaced apart from each other in a radial direction, shown by arrow 30 in FIG. 1, for centering the primary flange 20 and the secondary flange 26 in a radially spaced coaxial manner, shown by arrow 32 in FIG. 1. The primary mounting zone 18 provides an outer circumferential connection region 34 with at least three mounting points 36 for attaching the primary flange 20. The secondary mounting zone 24 provides an inner circumferential connection region 38 with at least three mounting points 40 for attaching the secondary flange 26. A thermal path, a shown by arrow 42 in FIG. 1, within the circular support structure 16 between a mounting point 44 of the primary mounting zone 18 and an adjacent spaced apart mounting point 46 of the secondary mounting zone 24 is longer than the distance between the two points.

The support 10 can also be referred to as spacer, spacing device, or joinder, linkage, joining, interface, junction, conjunction or interconnection.

In an example, the support is made by additive manufacturing.

Primary can also be referred to as first, firstly, outer and vice versa.

Secondary can also be referred to as second, secondly, inner and vice versa.

In an example, the support 10 can also be understood as a radial clamp or tweezers, not shown in FIG. 1.

The coaxial flanges 12 can also be referred to as connecting elements or coupling elements.

The term "coaxial" relates to a manner which arranges linear hollow objects along a common direction, where one hollow object encloses the other hollow object, as shown in FIG. 1.

The term "coaxial flange" relates to a smaller flange which is arranged within a larger flange, where both flanges orient at the same vector in space.

In an example, the flanges can deviate from their coaxial arrangement in that they are not equally spaced from each other.

The term "flange" relates to a connecting element at the end portion of a tubing or piping, that can abut to another flange of another tubing, to establish a connection between the tubing and the other tubing.

The term "double-coaxial coupling" relates to the afore mentioned flange arrangement of a smaller flanged enclosed by a larger flange, secondary flange 26 and primary flange 20 in FIG. 1 respectively, where both, the smaller flange and the larger flange, are configured to establish a connection to a smaller flange and a larger flange of another coaxial flange arrangement.

The term "circular support structure" relates to an annular connecting arrangement that is formed to follow the circular end portion of a tube.

The zone can also be referred to as area.

The term "mounting zone" relates to an area that is strong enough to keep flanges and their associates tube segments apart.

The term "primary outer tube" can also be referred to as outer tube or outer tubing.

The term "secondary inner tube" can also be referred to as inner tube or inner tubing.

The term "attaching" relates to a welded connection or a material-locking connection of the mounting zones to the flanges, in FIG. 1.

The term "outer tube" relates to a piping or tubing that is large enough in a radial direction to provide its inner lumen to a smaller piping or tubing.

The term "radial direction", also expressed as "radially", is defined by the radius defining the volume of the inner lumen of the tubing.

In an example, the axial direction, also expressed as "axially" is defined by the length defining the volume of the inner lumen of the tubing, in FIG. 1.

The term "inner tube" relates to a piping or tubing that is small enough to be contained by the outer tube, as shown in FIG. 1.

In an example, the tubes can be elliptically or comprise a cornered shaped profile.

In an example, the tubes are configured to transport gases.

In an example, the tubes are configured to transport cryogenic hydrogen.

The term "spaced apart" relates to the arrangement of the primary mounting zone 18 with respect to the secondary mounting zone 24 at the circular support structure 16 such that they do not contact each other and in the radial direction a distance is provided between the primary mounting zone 18 and the secondary mounting zone 24, as shown in FIG. 1.

In an example, the circular support structure 16 is formed, such that it provides an intermediate annular cavity that separates the primary flange 20 from the secondary flange 26, as shown in FIG. 1.

In an example, the intermediate annular cavity is configured to thermally insulate the second coupling element from the first coupling element.

The term "centering" relates to the function of the circular support structure 16 in aligning the secondary flange 26 in the primary flange 20.

In an example, the center of the secondary flange 26 and the primary flange 20 vary, not shown in FIG. 1.

The term "radially spaced coaxial manner" relates to an arrangement wherein the smaller secondary flange 26 and the larger primary flange 20 comprise the same centre.

The term "mounting points" relates to areas that provide a direct physical connection between the inner circumferential connection region 38 and the outer circumferential connection region 34 to the secondary and primary flange 20, in FIG. 1.

In an example, more than at least three mounting points 36, 40 are provided, for example four, five or eight mounting points.

In an example, the at least three mounting points 36, 40 are provided to prevent a shifting of the primary flange 20 with respect to the secondary flange 26.

In an example, the at least three mounting points 36, 40 are provided as welded, soldered, bonded connections between the outer circumferential connection region 34 and the inner circumferential connection region 38 and the primary and secondary flange 20, 26.

In an example, the at least three mounting points 36, 40 are interconnected to yield a single mounting point.

In an example, the at least three mounting points 36, 40 are provided by a single welded line.

In an example, the at least three mounting points 36, 40 are provided from manufacturing the circular support structure 16 with the primary and secondary flange 20, 26 from a single piece.

In an example, the at least three mounting points 36, 40 are provided from manufacturing the circular support structure 16 with the primary and secondary flange 20, 26 from a single piece from casting, CNC machining or additive manufacturing.

In an example, the at least three mounting points 36, 40 represent a material-locking connection between the circular support structure 16 with the primary and secondary flange 20, 26.

The term "inner circumferential connection region" relates to an area that is formed to connect to an outer region of the secondary flange 26, that is not part of the inner lumen of the inner tube, as shown FIG. 1.

The term "outer circumferential connection region" relates to an area that is formed to connect to an inner region of the primary flange 20, that is part of the inner lumen of the outer tube, as shown in FIG. 1.

The term "thermal path" relates to the load path, as shown by arrow 42 in FIG. 1, between the mounting point 44 of the primary mounting zone 18 and the adjacent spaced apart mounting point 46 of the secondary mounting zone.

In an example, the thermal path of the circular support structure 16 is represented as an elongated connection. The elongated connection acts as the load path to convey the outer applied forces from the primary flange 20 to the inner secondary flange 26.

In an example, the load path within the circular support structure 16 between a mounting point 44 of the primary mounting zone 18 and an adjacent spaced apart mounting point 46 of the secondary mounting zone is longer than the distance between the two points, as also demonstrated by the arrow 42 in FIG. 1.

In an example, the thermal path is configured as an elongated material-based connection between a mounting point 44 of the primary mounting zone 18 and an adjacent spaced apart mounting point 46 of the secondary mounting zone. The thermal path is configured as an elongated material-based connection that is longer than the direct distance or a direct connection between the mounting point 44 of the primary mounting zone 18 and an adjacent spaced apart mounting point 46. The material-based connection acts as a link or bridging element between the mounting point 44 of the primary mounting zone 18 and an adjacent spaced apart mounting point 46. Thermal energy at a mounting point 44 of the primary mounting zone is guided via the elongated material-based connection to an adjacent spaced apart mounting point 46 of the secondary mounting zone and travels a longer way than the shortest, direct distance between the mounting point 44 of the primary mounting zone 18 and an adjacent spaced apart mounting point 46. The individual mounting points 44 of the primary mounting zone are separate and thermally insulated from each other, the same relates to the spaced apart mounting points 46.

In an example, the thermal path is configured as a spacer element of the circular support structure 16 that keeps a mounting point 44 of the primary mounting zone 18 and an adjacent spaced apart mounting point 46 of the secondary mounting zone apart from each other. The thermal path is further configured as a spacer element that keeps the primary and the secondary flange 20, 26 apart. The spacer element keeps the primary and the secondary flange 20, 26 apart to form an annular cavity between the primary and the secondary flange 20, 26. The spacer element forms the annular cavity between the primary and the secondary flange 20, 26 to thermally insulate the primary and the secondary flange 20, 26. In this example, the only way the heat can travel between the primary and the secondary flange 20, 26 is the thermal path.

In an example, the thermal path is a spacer element that is formed to channel a heat flow between the primary and the secondary flange 20, 26 at the mounting point 44 of the primary mounting zone 18 and the adjacent spaced apart mounting point 46 of the secondary mounting zone.

In an example, the thermal path is the shortest possible and most direct path heat can travel through a material between a mounting point 44 of the primary mounting zone 18 and an adjacent spaced apart mounting point 46 of the secondary mounting zone. The thermal path does not follow a zig-zag path or any other random path it follows a straight and in some cases a curved line.

In an example, the circular support structure 16 is made from a thermal insulating material in order to slow down thermal transport between the primary and the secondary flange 20, 26.

In an example, the material of the circular support structure 16 comprises a specific material not prone to hydrogen embrittlement, not shown in FIG. 1.

In an example, the material of the circular support structure 16 comprises a specific austenitic steel not prone to hydrogen embrittlement.

In an example of FIG. 1, the primary mounting zone 18 is provided as a circumferential primary mounting zone 48. The secondary mounting zone 24 is provided as a circumferential secondary mounting zone 50.

In an example, the circumferential mounting zones are provided as circular shaped zones, not shown in FIG. 1.

In another example, the circumferential mounting zones are provided as square shaped zones, not shown in FIG. 1.

In another example, the circumferential mounting zones are provided as oval or elliptic shaped zones, not shown in FIG. 1.

In an option of an example of FIG. 1, the primary mounting zone 18 and the secondary mounting zone 24 are provided by a plurality of at least three brackets 52, each bracket providing a mounting point 44 of the primary mounting zone 18 and a mounting point 46 of the secondary mounting zone 24. A circumferential connector 54 is provided which provides a common mount for the plurality of at least three brackets 52.

The term "bracket" relates to an object with a bend shape, having two limps with end faced connection points.

In an example, more than at least three brackets 52 are provided, for example, four, five or eight brackets.

In an example, the circumferential connector 54 is a wire or a ring-shaped object, as shown in FIG. 1.

In an example, the circumferential connector 54 comprises a heat capacity reservoir.

As an advantage, the plurality of at least three brackets 52 with their thinner material cross-section reduces thermal transport from the primary flange 20 to the secondary flange 26.

As an advantage, the plurality of at least three brackets 52 provides flexibility of the primary flange 20 with respect to the secondary flange 26.

In an example of FIG. 1, for an axially oriented fluid flow, the circular support structure 16 comprises axially oriented passages 56 between the circumferential primary mounting zone 48 and the circumferential secondary mounting zone 50.

In an example, the circumferential primary mounting zone 48 and the circumferential secondary mounting zone 50 are being arranged spaced apart from each other in the radial direction for allowing an axial flow in an annular tube volume provided by the primary outer tube 22 running coaxially to the secondary inner tub.

The annular tube volume can also be referred to as annular volume.

The term "axially oriented passages" relates to channels and/or holes provided at the circular support structure 16 that are able to pass fluids.

The term "fluid" relates to e. g. a liquid or gas, that continuously deforms, i.e., flows, under an applied shear stress or an external force.

As an advantage, a fluid can be channeled between the primary flange 20 and the secondary flange 26, in FIG. 1.

In an example of FIG. 1, the circular support structure 16 is preloadable by a force acting between the mounting point 44 of the primary mounting zone and the mounting point 46 of the secondary mounting zone.

In an example, the mounting point 44 of the primary mounting zone 18 and an adjacent spaced apart mounting point 46 of the secondary mounting zone 24, are the mounting point 44 of the primary mounting zone 18 and the mounting point 46 of the secondary mounting zone 24.

The term "preloadable" relates to a function of the circular support structure 16 in storing potential energy by the elasticity of its material, not shown in FIG. 1.

In an example, the circular support structure 16 acts like a spring.

As an advantage, the primary flange and the secondary flange are elastically connected to escape temperature-induced stress.

Figure 2:
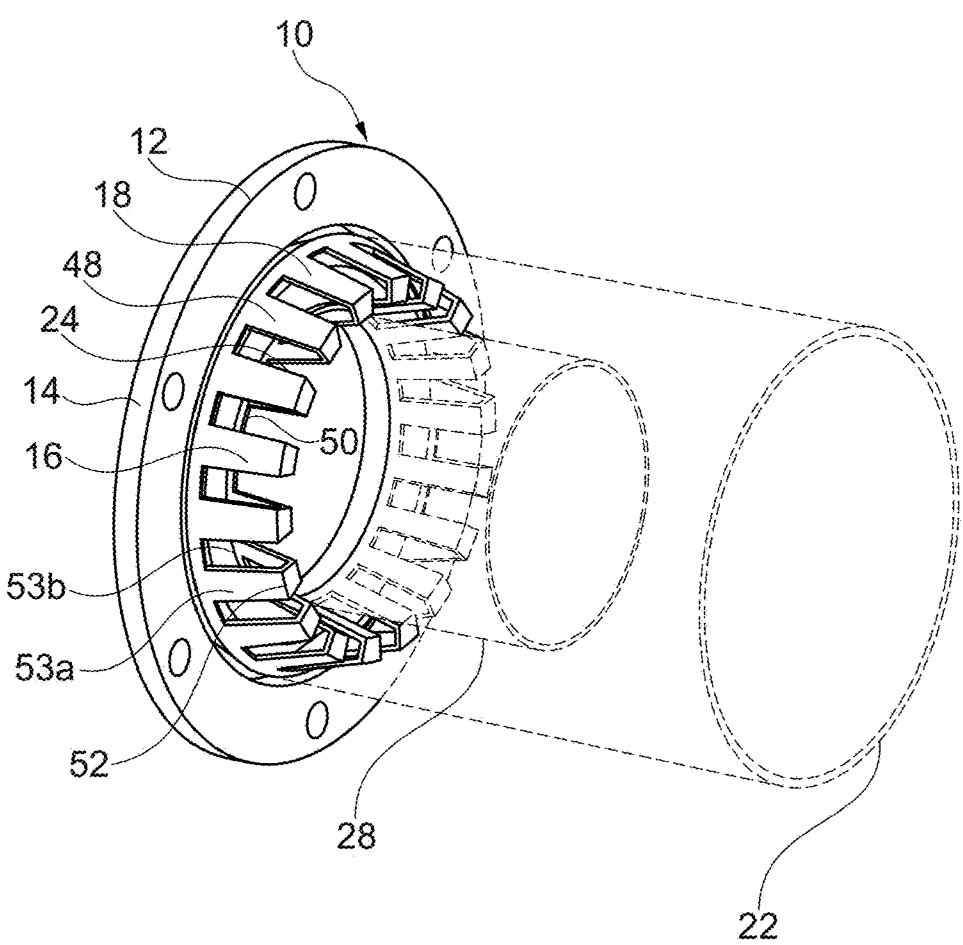
FIG. 2 shows an example of a support.

FIG. 2 shows an example of a support 10. The primary mounting zone 18 is also provided as a circumferential primary mounting zone 48 and the secondary mounting zone 24 is provided as a circumferential secondary mounting zone 50. The primary mounting zone 18 and the secondary mounting zone 24 are also provided by a plurality of at least three brackets 52, each bracket providing a mounting point 53*a* of the primary mounting zone 18 and a mounting point 53*b* of the secondary mounting zone 24. In FIG. 2 there is no circumferential connector 54 provided which provides a common mount for the plurality of at least three brackets 52.

In an example, the at least three brackets 52 comprise a U-shaped profile.

In an example, the at least three brackets 52 comprise a V-shaped profile.

In an example, the at least three brackets 52 comprise a spring like profile.

In an example, the at least three brackets 52 comprise are made from springs.

In an example, the at least three brackets and the support are made from a same single piece.

Figure 3:
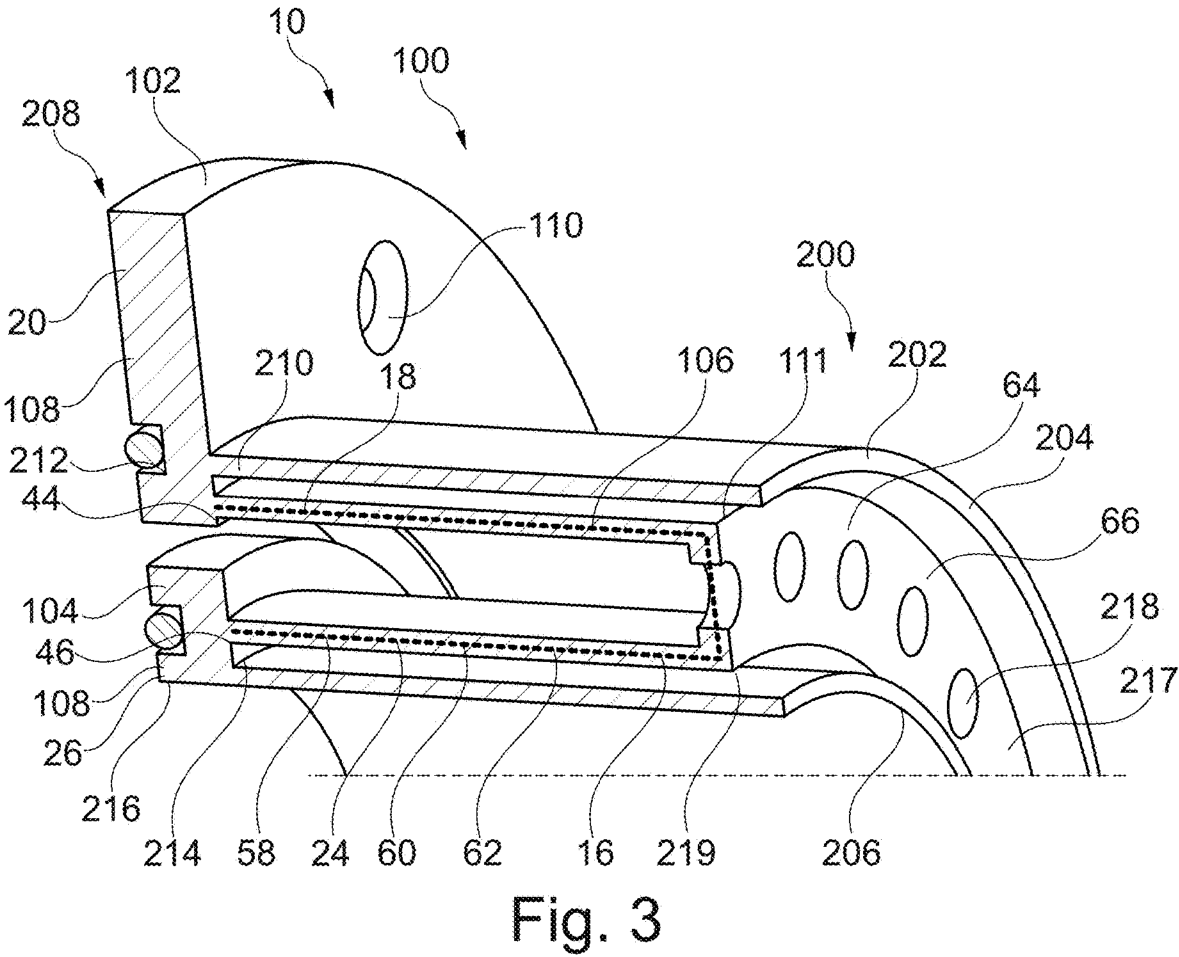
FIG. 3 schematically shows a cross section through examples of a support, a coupling and a double-coaxial conduit.

FIG. 3 schematically shows a cross section through an example of a support 10. The circular support structure 16 of the support 10 comprises a U-shaped profile 58 in its axial cross-section. The U-shaped profile 58 is open to the mounting point 44 of the primary mounting zone 18 and the mounting point 46 of the secondary mounting zone 24. The U-shaped profile 58 provides for stiffness between the mounting point 44 of the primary mounting zone 18 and the mounting point 46 of the secondary mounting zone 24 in an axial and radial direction.

In an example, an apex of the U-shaped profile 58 comprises a thermal reservoir for storing heat and slowing down the cooling transfer, not shown in FIG. 3.

The term "U-shaped profile" can be understood as a cup-shaped structure.

In an example, the U-shaped profile 58 encloses an annular cavity, as shown in FIG. 3.

In an example, the U-shaped profile is a V-shaped profile comprising a V-shape with a corner as the apex and straight V-legs.

In an example, the U-shaped profile comprises a mixture in between a U-shape and a V-shape.

In an example, the circular support structure 16 of the support 10 comprises a V-shaped profile 58 in its axial cross-section. The V-shaped profile 58 is open to the mounting point 44 of the primary mounting zone 18 and the mounting point 46 of the secondary mounting zone 24. The V-shaped profile 58 provides for stiffness between the mounting point 44 of the primary mounting zone 18 and the mounting point 46 of the secondary mounting zone 24 in an axial and radial direction.

As an advantage, a force transmission between the mounting point of the primary mounting zone and the mounting point of the secondary mounting zone is improved.

In an example of FIG. 3, legs 60 of the U-shaped profile 58 comprise sleeve-like structures 62. An apex 64 of the U-shaped profile 58 comprises a ring-like structure 66.

In an example, the ring-like structure 66 comprises a thermal reservoir for storing heat and slowing down the cooling transfer.

In an example, the sleeve-like structures 62 and the ring-like structures 66 are made from a single piece.

In an example, the U-shaped profile 58 comprises corners at the transitions from the legs 60 to the apex 64 in order to increase its stiffness, as shown in FIG. 3.

In an example, the ring-like structure 66 comprises axially oriented passages 56 to let a fluid pass, as shown in FIG. 3.

In an example, the sleeves and the ring form a sleeve-ring-sleeve part.

In an example, the load path length is enlarged with the help of the "sleeve-ring-sleeve part" and the direct connection between the primary and the secondary flange 20, 26 is cut, as shown in FIG. 3.

In an example, the long load path acts similar to a spring. It gives enough flexibility in radial direction at the same time it is stiff enough in axial direction to keep the seating load for the seal in order guarantee leak tightness of the secondary flange 26, that will be additionally adjusted with a certain pretension of the "sleeve-ring-sleeve part".

As an advantage, the longer load path in the U-shaped profile enables flexibility in radial direction whilst being relatively stiff in axial direction.

FIG. 3 also schematically shows a cross section through an example of a coupling 100. The coupling 100 comprises a primary flange 102, a secondary flange 104 and a support 106 according to one of the previous examples and options. The support 106 rigidly connects the primary flange 102 and the secondary flange 104 and centers the secondary flange 104 and the primary flange 102 in a radially spaced coaxial manner. The primary flange 102 and the secondary flange 104 respectively are each provided with an axially facing flange side 108 for a sealingly-tight coupling 100 connection to a respective counter part.

The term "respective counter part" relates to an adjoining coupling that abuts to the coupling and/or relates to abutting flanges of end portions of tubes, and/or relates to a matching end portion of another system. For example, the adjoining coupling, the abutting flanges of end portions of tubes and the end portion of another system, not shown in FIG. 3, are configured to provide a sealingly-tight transfer of a fluid via the abutting coupling.

The term "rigidly" relates to the property of the support 106 structure in being preloadable.

The term "sealingly-tight coupling connection" relates to a gas-leak tight connection between the flanges.

In an example, the gas-leak tight connection is configured to reduce diffusion of hydrogen gas in-between the connection to a respective counter part, not shown in FIG. 3.

In an example, the coupling 100 provides a gas-leak tight connection between the primary flange 102 and an adjoining other primary flange and between the secondary flange 104 and an adjoining other secondary flange, not shown in FIG. 3.

In an example, the primary and secondary flange 102, 104 comprise at least one recess having a seal for establishing a sealingly-tight connection to an adjoining primary and secondary flange, not shown in FIG. 3.

In an example of FIG. 3, the axially facing flange side 108 of the primary flange 102 is provided for a sealingly-tight abutment to an axially facing flange side 108 of a primary flange of an adjoining coupling. The axially facing flange side 108 of the secondary flange 104 is provided for a sealingly-tight abutment to an axially facing flange side 108 of a secondary flange of the adjoining coupling.

In an example, the surface of the axially facing flange side 108 is machined in order to provide a sealingly-tight abutment to another axially facing flange side that prevents diffusion of gases, especially hydrogen gas.

As an advantage, the flexible support prevents deformation of the coupling that would prevent a sealingly-tight abutment to an axially facing flange side of a secondary flange of the adjoining coupling.

In an example of FIG. 3, the primary flange 102 comprises at least one fastening area 110 for receiving an axially clamping force of a flange fastening structure for pressing the axially facing flange side 108 of the primary flange 102 to an abutting axially facing primary flange side of the adjoining coupling. A circular support structure 111 is configured to transfer the axially clamping force to the secondary flange 104 for pressing the axially facing flange side 108 of the secondary flange 104 to an abutting axially facing secondary flange side of the adjoining coupling, not shown in FIG. 3.

The term "fastening area" relates to a recess, a hole, a projection a nose, a hook that can be used to hold a fastening structure.

The term "flange fastening structure" relates to an object that is able to transmit a force between two different flanges, such that the two different flanges unite to form a tight connection.

In an example, the flange fastening structure is a bolt structure comprising bolt elements and bolt fastening elements, not shown in FIG. 3.

In an example, the flange fastening structure is a v-clamp, not shown in FIG. 3.

As an advantage, the reduction of thermal transport between the primary and secondary flange by the support prevents a temperature-induced deformation of the axially facing flange side 108 that would lead to leaking.

As an advantage, not additional mounting procedure or flange fastening structure is required for the secondary flange.

FIG. 3 also schematically shows a cross section through an example of a double-coaxial conduit 200. The double-coaxial conduit 200 comprises a double-coaxial tube arrangement 202 with a primary outer tube 204 and a secondary inner tube 206 and at least one coupling 208 according to one of the previous examples and options. A circumferential portion 210 of one end of the primary outer tube 204 is sealingly attached to a primary flange 212 of the coupling 208. A circumferential portion 214 of one end of the secondary inner tube 206 is sealingly attached to a secondary flange 216 of the coupling 208. A circular support structure 217 comprises axially oriented passages 218 between an inner side of the primary outer tube 204 and an outer side of the secondary inner tube 206.

In an example, the primary outer tube 204 encloses an annular lumen 219 in the gap between the outer tube wall of the secondary inner tube 206 and the inner tube wall of the primary outer tube 204. The annular lumen 219 can be used for receiving a fluid or a vacuum.

In an example, the annular lumen 219 can be used for receiving an inert gas, not shown in FIG. 3.

In an example, the annular lumen 219 is configured to keep a vacuum, not shown in FIG. 3.

In an example, the annular lumen 219 is configured to keep an inert gas under a pressure, not shown in FIG. 3.

In an example, the annular lumen 219 of the double-coaxial conduit 200 keeps a fluid. Another coupling of another double coaxial conduit is abutting the coupling 208 of the double-coaxial conduit 200, having axially oriented passages 218 between an inner side of the primary outer tube 204 and an outer side of the secondary inner tube 206. Having these axially oriented passages 218 allows a flow of the fluid between the annular lumen 219 of the double-coaxial conduit 200 and the other double-coaxial conduit 200 beyond their coupling in FIG. 3. By means of these axially oriented passages 218 an extended annular lumen 219 is provided.

In an example, the circumferential portion 210 of one end of the primary outer tube 204 and/or the circumferential portion 214 of one end of the secondary inner tube 206 is welded to the primary flange 212, respectively the secondary flange 216 of the coupling 208.

In an example, the circumferential portion 210 of one end of the primary outer tube 204 and/or the circumferential portion 214 of one end of the secondary inner tube 206 is formed as the primary flange 212, respectively the secondary flange 216 of the coupling 208.

In an example, the double-coaxial conduit 200 can be regarded as one pre-assembly for consisting of two double wall pipe flanges and the inner and outer pipe.

Figures 4, 5:
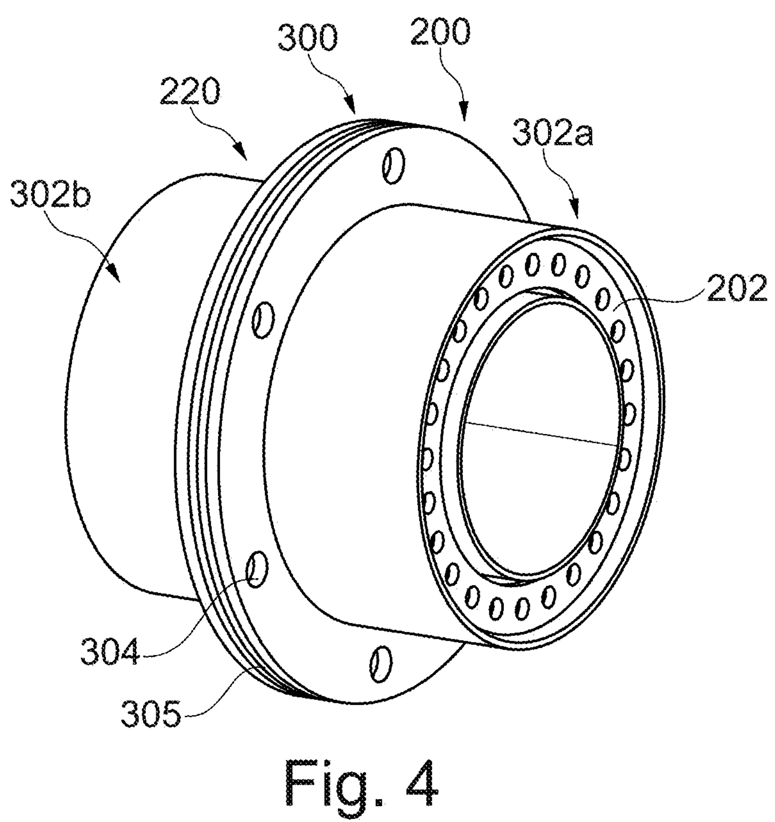
FIG. 4 schematically shows an example of a double-coaxial conduit and a double-coaxial tubing system.
FIG. 5 schematically shows an example of an aircraft comprising a double-coaxial tubing system.

FIG. 4 schematically shows an example of a double-coaxial conduit 200 and a double-coaxial tubing system 300.

In an example of FIG. 4, a second coupling 220, according to the previous examples and options, is provided attached to the other end of the double-coaxial tube arrangement 202 of the double-coaxial conduit 200.

As an advantage, the double-coaxial conduit allows for a flow of a fluid in the annular lumen beyond the flanges into another annular lumen of another double-coaxial conduit abutting the double-coaxial conduit.

As a further advantage, a hydrogen leakage at the primary flange is prevented by a pressurized gas in the annular lumen and the axially oriented passages 218.

As an advantage, a leak-tight connection between two double-coaxial tube arrangements is provided, since the temperature-induced deformation of their abutting axially facing flange sides is prevented.

In an example of FIG. 4, the double-coaxial tubing system 300 comprises at least two double-coaxial conduits 302*a*, 302*b*, according to the previous examples and options, and at least one fastening structure 304. The fastening structure 304 provides a clamping force by pressing adjacent primary flanges 305 of the at least two double-coaxial conduits against each other.

In an example, the material of the double-coaxial tubing system 300 comprises a specific material not prone to hydrogen embrittlement.

In an example, the material of the double-coaxial tubing system 300 comprises a specific austenitic steel not prone to hydrogen embrittlement.

In an example, the material of the two double-coaxial conduits comprises a specific austenitic steel not prone to hydrogen embrittlement.

In an example, the material of the fastening structure 304 comprises a specific austenitic steel not prone to hydrogen embrittlement.

FIG. 5 schematically shows an example of an aircraft 400 comprising a double-coaxial tubing system 406. The aircraft 400, comprises a fluid reservoir 402 storing a fluid, at least one load 404 configured for operating with the fluid and a double-coaxial tubing system 406 of the previous example. The double-coaxial tubing system 406 supplies the fluid from the fluid reservoir 402 to the at least one load.

In an example, a venting double-coaxial tubing system 406*a* allows venting of a cryogenic fluid from the fluid reservoir 402, as shown in FIG. 5.

In an example, the load comprises a fuel cell.

In an example, the fluid reservoir 402 comprises cryogenic hydrogen and is configured to store cryogenic hydrogen.

In an example, the fluid reservoir 402 is configured to supply cryogenic hydrogen to the double-coaxial tubing system 406.

As an advantage, the double-coaxial tubing system supports the installation of hydrogen systems on an aircraft.

As an advantage, the double-coaxial tubing system supports the installation of a hydrogen venting system on an aircraft FIG. 6 shows basic steps of an example of a method 500 for providing a support 10 for coaxial flanges 12 of a double-coaxial coupling 14. The method 500 comprises the following steps:

In a first step 502 a circular support structure 16 is provided,

In a second step 504, at the circular support structure 16, a primary mounting zone 18 for attaching a primary flange 20 for connecting a primary outer tube 22 is provided, In an third step 506, at the circular support structure 16, a secondary mounting zone 24 for attaching a secondary flange 26 for connecting a secondary inner tube 28 coaxial to the primary outer tube 22 is provided. The primary mounting zone 18 and the secondary mounting zone 24 are spaced apart from each other in a radial direction for centering the primary flange 20 and the secondary flange 26 in a radially spaced coaxial manner. The primary mounting zone 18 provides an outer circumferential connection region 34 with at least three mounting points 36 for attaching the primary flange 20. The secondary mounting zone 24 provides an inner circumferential connection region 38 with at least three mounting points 40 for attaching the secondary flange 26. A thermal path within the circular support structure 16 between a mounting point 44 of the primary mounting zone 18 and an adjacent spaced apart mounting point 46 of the secondary mounting zone 24 is longer than the distance between the two points.

In an example of the method, an existing double-coaxial coupling 14 is retrofitted with the circular support structure 16.

In an example, the at least three mounting points 36, 40 are provided as welded, soldered, bonded connections between the outer circumferential connection region 34 and the inner circumferential connection region 38 and the primary and secondary flange 20, 26.

In an example, the at least three mounting points 36, 40 are interconnected to yield a single mounting point.

In an example, the at least three mounting points 36, 40 are provided by a single welded line.

In an example, the at least three mounting points 36, 40 are provided from manufacturing the circular support structure 16 with the primary and secondary flange 20, 26 from a single piece.

In an example, the at least three mounting points 36, 40 are provided from manufacturing the circular support structure 16 with the primary and secondary flange 20, 26 from a single piece from casting, CNC machining or additive manufacturing.

In an example, the at least three mounting points 36, 40 represent a material-locking connection between the circular support structure 16 with the primary and secondary flange 20, 26.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A support for coaxial flanges of a double-coaxial coupling, the support comprising a circular support structure;

wherein the circular support structure comprises:

a primary mounting zone for attaching a primary flange for connecting a primary outer tube;

a secondary mounting zone for attaching a secondary flange for connecting a secondary inner tube coaxial to the primary outer tube;

wherein the primary mounting zone and the secondary mounting zone are spaced apart from each other in a radial direction for centering the primary flange and the secondary flange in a radially spaced coaxial manner;

wherein the primary mounting zone comprises an outer circumferential connection region with at least three mounting points for attaching the primary flange;

wherein the secondary mounting zone comprises an inner circumferential connection region with at least three mounting points for attaching the secondary flange;

wherein a thermal path within the circular support structure between a mounting point of the primary mounting zone and an adjacent spaced apart mounting point of the secondary mounting zone is longer than the distance between the two points;

wherein the circular support structure comprises a U-shaped profile in an axial cross-section thereof, wherein legs of the U-shaped profile comprise sleeve structures;

wherein an apex of the U-shaped profile comprises a ring structure, wherein the primary mounting zone and the secondary mounting zone are provided by a plurality of at least three brackets, each bracket providing one of the at least three mounting points of the primary mounting zone and one of the at least three mounting points of the secondary mounting zone; and wherein the support further comprises a circumferential connector providing a common mount for the plurality of at least three brackets.

2. The support according to claim 1, wherein the primary mounting zone is configured as a circumferential primary mounting zone; and wherein the secondary mounting zone is configured as a circumferential secondary mounting zone.

3. The support according to claim 2, wherein, for an axially oriented fluid flow, the circular support structure comprises axially oriented passages between the circumferential primary mounting zone and the circumferential secondary mounting zone.

4. The support according to claim 1, wherein the circular support structure is preloadable by a force acting between the mounting point of the primary mounting zone and the mounting point of the secondary mounting zone.

5. The support according to claim 1, wherein the U-shaped profile is open to one of the at least three mounting points of the primary mounting zone and one of the at least three mounting points of the secondary mounting zone; and wherein the U-shaped profile provides for stiffness between the one of the at least three mounting points of the primary mounting zone and the one of the at least three mounting points of the secondary mounting zone in an axial and radial direction.

6. A coupling comprising:

a primary flange;

a secondary flange;

a support for coaxial flanges of a double-coaxial coupling, the support comprising a circular support structure;

wherein the circular support structure comprises:

a primary mounting zone for attaching a primary flange for connecting a primary outer tube;

a secondary mounting zone for attaching a secondary flange for connecting a secondary inner tube coaxial to the primary outer tube;

wherein the primary mounting zone and the secondary mounting zone are spaced apart from each other in a radial direction for centering the primary flange and the secondary flange in a radially spaced coaxial manner;

wherein the primary mounting zone comprises an outer circumferential connection region with at least three mounting points for attaching the primary flange;

wherein the secondary mounting zone comprises an inner circumferential connection region with at least three mounting points for attaching the secondary flange;

wherein a thermal path within the circular support structure between a mounting point of the primary mounting zone and an adjacent spaced apart mounting point of the secondary mounting zone is longer than the distance between the two points;

wherein the circular support structure comprises a U-shaped profile in an axial cross-section thereof, wherein legs of the U-shaped profile comprise sleeve structures; and wherein an apex of the U-shaped profile comprises a ring structure;

wherein the support rigidly connects the primary flange and the secondary flange and centers the secondary flange and the primary flange in a radially spaced coaxial manner; and wherein the primary flange and the secondary flange respectively each comprises an axially facing flange side for a sealingly-tight coupling connection to a respective counterpart.

7. The coupling according to claim 6, wherein the axially facing flange side of the primary flange is configured for a sealingly-tight abutment to an axially facing flange side of a primary flange of an adjoining coupling; and wherein the axially facing flange side of the secondary flange is configured for a sealingly-tight abutment to an axially facing flange side of a secondary flange of the adjoining coupling.

8. The coupling according to claim 6, wherein the primary flange comprises at least one fastening area for receiving an axially clamping force of a flange fastening structure for pressing the axially facing flange side of the primary flange to an abutting axially facing primary flange side of the adjoining coupling; and wherein the circular support structure is configured to transfer the axially clamping force to the secondary flange for pressing the axially facing flange side of the secondary flange to an abutting axially facing secondary flange side of the adjoining coupling.

9. A double-coaxial conduit comprising:

a double-coaxial tube arrangement comprising:

a primary outer tube; and a secondary inner tube; and at least one coupling according to claim 8;

wherein a circumferential portion of one end of the primary outer tube is sealingly attached to the primary flange of the coupling;

wherein a circumferential portion of one end of the secondary inner tube is sealingly attached to the secondary flange of the coupling; and wherein a circular support structure comprises axially oriented passages between an inner side of the primary outer tube and an outer side of the secondary inner tube.

10. The conduit according to claim 9, further comprising a second coupling according to claim 8 attached to the other end of the double-coaxial tube arrangement.

11. A double-coaxial tubing system comprising:

at least two double-coaxial conduits according to claim 9; and at least one fastening structure;

wherein the fastening structure provides a clamping force by pressing adjacent primary flanges of the at least two double-coaxial conduits against each other.

12. An aircraft comprising:

a fluid reservoir storing a fluid;

at least one load configured for operating with the fluid; and a double-coaxial tubing system of claim 11;

wherein the double-coaxial tubing system is configured to supply the fluid from the fluid reservoir to the at least one load.

13. A method for providing a support for coaxial flanges of a double-coaxial coupling, comprising:

providing a circular support structure;

providing, at the circular support structure, a primary mounting zone for attaching a primary flange for connecting a primary outer tube;

providing, at the circular support structure, a secondary mounting zone for attaching a secondary flange for connecting a secondary inner tube coaxial to the primary outer tube;

wherein the primary mounting zone and the secondary mounting zone are spaced apart from each other in a radial direction for centering the primary flange and the secondary flange in a radially spaced coaxial manner;

wherein the primary mounting zone provides an outer circumferential connection region with at least three mounting points for attaching the primary flange;

wherein the secondary mounting zone provides an inner circumferential connection region with at least three mounting points for attaching the secondary flange;

wherein a thermal path within the circular support structure between a mounting point of the primary mounting zone and an adjacent spaced apart mounting point of the secondary mounting zone is longer than the distance between the two points;

wherein the primary mounting zone and the secondary mounting zone are provided by a plurality of at least three brackets, each bracket providing one of the at least three mounting points of the primary mounting zone and one of the at least three mounting points of the secondary mounting zone; and wherein the support further comprises a circumferential connector providing a common mount for the plurality of at least three brackets.

* * * * *